United States Patent
Bunkus et al.

(10) Patent No.: US 12,480,454 B2
(45) Date of Patent: Nov. 25, 2025

(54) OPERATION OF A MOTOR VEHICLE AS A FUNCTION OF EXHAUST EMISSIONS

(71) Applicant: Volkswagen Aktiengesellschaft, Wolfsburg (DE)

(72) Inventors: Johannes Bunkus, Hoetensleben OT Barneberg (DE); Stephan Kraus, Gross Twuelpstedt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/798,587

(22) Filed: Aug. 8, 2024

(65) Prior Publication Data
US 2025/0052208 A1  Feb. 13, 2025

(30) Foreign Application Priority Data
Aug. 8, 2023 (DE) .................... 10 2023 207 600.4

(51) Int. Cl.
*F02D 41/02* (2006.01)
*B60Q 9/00* (2006.01)

(52) U.S. Cl.
CPC ............. *F02D 41/021* (2013.01); *B60Q 9/00* (2013.01)

(58) Field of Classification Search
CPC .................. F02D 41/021; B60Q 9/00
See application file for complete search history.

(56) References Cited

U.S. PATENT DOCUMENTS

| | | | |
|---|---|---|---|
| 9,773,355 B2 | 9/2017 | Mitchell | |
| 10,167,794 B2 | 1/2019 | Kraemer et al. | |
| 11,078,822 B2 | 8/2021 | Walter et al. | |
| 2018/0154897 A1* | 6/2018 | Willimowski | F01N 9/005 |

FOREIGN PATENT DOCUMENTS

| | | |
|---|---|---|
| DE | 102014215577 A1 | 2/2016 |
| DE | 102015014150 A1 | 11/2016 |
| DE | 102016001367 A1 | 8/2017 |
| DE | 102016208834 A1 | 11/2017 |
| DE | 102017002107 A1 | 9/2018 |
| DE | 102017223209 A1 | 6/2019 |

(Continued)

*Primary Examiner* — Kevin A Lathers
(74) *Attorney, Agent, or Firm* — Muncy, Geissler, Olds & Lowe, P.C.

(57) ABSTRACT

A method for operating a motor vehicle with an internal combustion engine, comprising a combustion engine and an exhaust line with an exhaust aftertreatment system. At least one environmental emission of an exhaust component or multiple exhaust components, contained in the exhaust gas generated by the combustion engine, is determined. If a limitation threshold value for the environmental emission of the exhaust component or at least one of the exhaust components is exceeded, the operation of the combustion engine is limited with respect to the deliverable power. If a warning threshold value for the environmental emission of the exhaust component or at least one of the exhaust components, which is lower than the limitation threshold value, is exceeded, a warning message is triggered and/or the operation of the internal combustion engine is adapted in a power-neutral manner such that the environmental emission of the exhaust component is reduced.

13 Claims, 2 Drawing Sheets

(56) References Cited

FOREIGN PATENT DOCUMENTS

| | | | |
|---|---|---|---|
| DE | 102018120556 A1 | | 2/2020 |
| DE | 102018213076 A1 | | 2/2020 |
| DE | 102022124333 A1 * | 12/2022 | ............... B60K 6/48 |
| EP | 0628799 A1 | | 12/1994 |
| EP | 1435444 A2 | | 7/2004 |

* cited by examiner

OPERATION OF A MOTOR VEHICLE AS A FUNCTION OF EXHAUST EMISSIONS

This nonprovisional application claims priority under 35 U.S.C. § 119(a) to German Patent Application No. 10 2023 207 600.4, which was filed in Germany on Aug. 8, 2023, and which is herein incorporated by reference.

BACKGROUND OF THE INVENTION

Field of the Invention

The invention relates to a method for operating a motor vehicle with an internal combustion engine, comprising a combustion engine and an exhaust line with at least one exhaust aftertreatment device.

Description of the Background Art

In order to realize the lowest possible pollutant emissions from an internal combustion engine, the exhaust aftertreatment devices integrated into the exhaust line, which can be in particular one or more catalysts and a particulate filter, should as far as possible always have temperatures which are above the respective start-up temperature (also known as the light-off temperature) beyond which a sufficient effectiveness with regard to the intended exhaust aftertreatment can be assumed. After a cold start of the internal combustion engine, in which the exhaust aftertreatment devices can have temperatures that are below the respective light-off temperature, the temperatures of at least some of the exhaust aftertreatment devices should reach the respective light-off temperature as quickly as possible. To ensure this it is known to actively heat exhaust aftertreatment devices, which is possible, for one thing, by means of heating devices provided for this purpose, which can comprise, for example, electric heating elements or be designed as burners. Furthermore, so-called in-engine measures can be implemented, which aim to generate a relatively hot exhaust gas through targeted operation of the combustion engine with a relatively poor efficiency, so that a relatively rapid heating of the exhaust aftertreatment devices can be achieved via the exhaust gas.

Due to further tightening of pollutant emission regulations, these measures may not be sufficient either, because they only accelerate the exhaust aftertreatment devices becoming operative, but do not guarantee this immediately with the start-up of the combustion engine. The problem could therefore arise that pollutant emission limits are not complied with if a motor vehicle switches to a driving mode immediately after a cold start of the associated internal combustion engine, for which the combustion engine of the internal combustion engine must provide a relatively high output, which is accompanied by a correspondingly large exhaust gas mass flow.

DE 10 2017 002 107 A1 discloses a method for operating a motor vehicle with an internal combustion engine, an exhaust aftertreatment system, and a certification of compliance with statutory emission limits for toxic exhaust gases, wherein an intervention relevant to exhaust emissions is made in the control of the internal combustion engine and/or the exhaust aftertreatment system by an engine control unit or by other means, so that the vehicle operation in a special operating mode deviates from normal operation for the certification of the exhaust gas limits, wherein this intervention is aimed at reducing at least one harmful exhaust component, and so that means of proof are provided that are to confirm that this deviation from the normal operation of the certification is legally permissible. In this case, a limitation of the maximum engine torque accessible by a driver of the motor vehicle at a given engine speed or driving speed or of the maximum injectable fuel mass can be provided as an intervention relevant to exhaust emissions.

DE 10 2022 124 333 A1 describes a method for changing the behavior of a vehicle drive system, wherein the method comprises the following steps: detecting the state of the drive system; estimating the emission values of the treated exhaust gases, taking into account the state of the drive system; comparing the estimated emission values with emission limit values and determining the difference between the estimated emission values and the emission limit values (EC); for the case that the difference exceeds or falls below a threshold value: selecting at least one measure affecting the behavior of the drive system, taking into account the determined difference such that the emission values of the treated exhaust gases are changed.

DE 10 2014 215 577 A1 discloses a method for controlling the exhaust aftertreatment in a vehicle powered by a combustion engine. The reliable availability of the vehicle without unreasonable disadvantages due to the exhaust aftertreatment system should be realized by adapting the exhaust aftertreatment to changing, relevant exhaust gas standards during the vehicle's life on a region-specific basis.

DE 10 2016 001 367 A1, which corresponds to US 2017/0226946, describes a method for controlling a combustion engine of a vehicle with the following method steps: determining the driving state of the vehicle and generating corresponding driving state signals; determining the emission values of the exhaust gases emitted by the combustion engine using the driving state signals; comparing the determined emission values with predefined emission limit values, wherein for the case that the determined emission values exceed the predefined emission limit values: controlling the combustion engine and/or an exhaust aftertreatment system such that the determined emission values are reduced until they lie below the predefined emission limit values.

U.S. Pat. No. 9,773,355 B2 discloses a radio-based check of the exhaust emissions of a motor vehicle, wherein transmission of information to a driver of the motor vehicle is provided, if emission limits are currently being exceeded or are likely to be exceeded in the future.

SUMMARY OF THE INVENTION

It is therefore an object of the invention to improve an exhaust emission behavior of an internal combustion engine of a motor vehicle during operation of the motor vehicle.

According to an example of the invention, a method for operating a motor vehicle is provided, wherein the motor vehicle comprises an internal combustion engine which has at least one combustion engine and an exhaust line with an exhaust aftertreatment system. The exhaust aftertreatment system may comprise one or more exhaust aftertreatment devices, for example, one or more catalytic converters and/or a particulate filter. At least one environmental emission (i.e., an emission into the surroundings/environment) of an exhaust component or multiple exhaust components, contained in the exhaust gas generated by the combustion engine, is determined and, if a limitation threshold value for the environmental emission of the exhaust component or for the environmental emission of at least one of the exhaust components is exceeded, the operation of the combustion engine is limited with regard to the deliverable power (and thus with regard to the operating speed at which the combustion engine can be operated and/or with regard to the operating torque that can be delivered by it). Because the exhaust emissions of the combustion engine tend to increase with increasing power output, the power limitation, which is triggered when the limitation threshold value for the at least one exhaust component is exceeded, is intended to prevent excessive exhaust emissions arising with regard to the exhaust component(s) when the motor vehicle is operated. In particular, this is intended to prevent the environmental emission of at least one and in particular all exhaust components from exceeding an emission limit value that is defined for this (these) exhaust component(s) (in each case), in particular defined by law.

The exhaust component or components may in particular be one, several, or all of the following: HC, CO, $NO_x$, (soot) particles, $NH_3$, $N_2O$, and/or $CH_2O$.

Because a power limitation with regard to the operation of the combustion engine can represent a restriction in the use of the motor vehicle and can be perceived as negative by a driver of the motor vehicle, it is further provided according to the invention that, if a warning threshold value for the environmental emission of the exhaust component or at least one of the exhaust components, which is lower than the limitation threshold value for the (respective) exhaust component, is exceeded, a warning message is triggered and/or the operation of the internal combustion engine is adapted in a power-neutral manner (i.e., without a limitation with regard to the power that can be delivered by the combustion engine) in such a way that the environmental emission of the corresponding exhaust component is reduced. In this case, it is possible to deviate from a consumption-optimized operation.

Preferably, it is provided that the determined environmental emission, the limitation threshold value, and the warning threshold value and, if applicable, the emission limit value are related to a defined travel distance, so that the environmental emission is averaged over this travel distance and compared with a corresponding limitation threshold value, which may be based on an emission limit value, if applicable, and warning threshold value. As a result, short-term emission peaks do not immediately or necessarily lead to the threshold values being exceeded, which enables a sensible operation of the internal combustion engine and thus of the vehicle and is also based on how emission limit values are defined by law (usually in "mass"/km or "number"/km, averaged over the distance driven).

A journey may be defined as the use of the motor vehicle beginning with a use of the motor vehicle initiated by a driver of the motor vehicle (e.g., by actuating a start control element) until the end of this use by the driver of the motor vehicle (e.g., by actuating a stop control element), wherein the motor vehicle is moved during this use, also powered at least by the combustion engine. Such a journey can also include phases in which the vehicle is stationary and/or the combustion engine is temporarily not running, in particular due to an automated stop-start function. A travel distance is a distance driven during a journey.

A power-neutral operation adjustment of the internal combustion engine can comprise, for example, a change in the proportion of recirculated exhaust gas that is fed back to the combustion engine as a component of fresh gas and/or a change in the relative proportions of recirculated exhaust gas that are conducted via different exhaust gas recirculation lines, in particular a high-pressure exhaust gas recirculation line and a low-pressure exhaust gas recirculation line, and/or a change in control times according to which the gas exchange valves of the combustion engine are actuated, and/or a change in parameters with which fuel is introduced into the combustion chamber(s) of the combustion engine, and/or a change in parameters relating to the charging of fresh gas supplied to the combustion engine, and/or a change in a measure that has a direct effect on the ability of the exhaust aftertreatment system for the aftertreatment of the exhaust gas, such as, for example, initiating or increasing an active heating measure for the exhaust aftertreatment system and/or initiating or increasing the introduction of a reducing agent into the exhaust gas.

It can be achieved by the power-neutral operation adjustment of the internal combustion engine, if possible, that the environmental emission of the at least one exhaust component remains reduced during further operation of the motor vehicle to such an extent that the limitation threshold value, above which a power limitation is implemented with regard to the operation of the combustion engine, can be avoided. This applies in particular in combination with the triggering of the warning message, which triggering is also preferably provided when the warning threshold value is exceeded; the message can encourage the driver of the motor vehicle to adopt a lower-emission driving style and thus can also help to avoid exceeding the limitation threshold value. Accordingly, it may preferably be provided that a warning message is made known to the driver of the motor vehicle. This can be done visually by means of a warning display, for example, by a notification on a corresponding display of the motor vehicle, and/or acoustically by means of a corresponding warning signal and/or haptically, for example, by a vibration signal in a control element of the motor vehicle, for example, a steering wheel and/or an accelerator pedal. A triggered warning message can alternatively or additionally be stored in an operating memory of the motor vehicle for possible later evaluation and/or for documentation. The triggering of the warning message can also serve to inform the driver of the motor vehicle about an imminent power limitation with regard to the operation of the combustion engine in the event that the limitation threshold value would also be exceeded, so that the driver can take into account a corresponding power limitation in the operation of the motor vehicle and would not be surprised by it.

The limitation threshold value can be between 50% and 99% of an emission limit value defined for the exhaust component. Furthermore, it can preferably be provided that the warning threshold value is between 90% and 99% of the limitation threshold value. In this case, the limitation threshold value and/or the warning threshold value can be defined as fundamentally or permanently unchangeable. Preferably, however, it is provided that the limitation threshold value and/or the warning threshold value are variable as a function of at least one parameter, in particular as a function of the distance already completed in the current journey, in particular variable within the specified percentage value range. In this case, it can particularly preferably be provided that the limitation threshold value and/or the warning threshold value increase(s) (continuously, in particular linearly) at least in sections with an increasing travel distance. This takes into account that emission peaks can have less of an effect on the environmental emission related to a travel distance with an increasing travel distance, so that it is possible to define the limitation threshold value generally to be closer to the emission limit value with an increasing travel distance, without risking exceeding the emission limit value to a greater extent, and/or to define the warning threshold value generally to be closer to the limitation threshold value with an increasing travel distance, without risking exceeding the limitation threshold value to a greater extent.

The limitation threshold value and/or the warning threshold value can increase with an increasing travel distance during a first travel distance section, which may preferably correspond to a travel distance of between 10 km and 50 km, and remains constant with an increasing travel distance during a second travel distance section, which preferably directly follows or includes the first travel distance section if the second travel distance section considered is greater than the first, and which furthermore preferably ends with the end of the journey. A constant limitation threshold value and/or warning threshold value during the second travel distance section can be used in particular to maintain a minimum distance from the reference value (emission limit value or limitation threshold value). This minimum distance can also reflect the time required to implement measures the aim of which is that the respective reference value is not exceeded. The increase in the limitation threshold value and/or the warning threshold value can preferably be continuous and, for example, can be linear or also be based on any other curve, however.

Furthermore, it can preferably be provided that the warning threshold value can increase more greatly than the limitation threshold value during the first travel distance section; this takes into account that it may be provided to reliably prevent the emission limit value from being exceeded, whereas exceeding the limitation threshold value is in fact to be avoided but can be accepted.

The environmental emission of the exhaust component or components can be measured and/or modeled by means of one or more suitable sensors. For modeling, operating parameters of the internal combustion engine, such as, for example, the operating speed of the combustion engine, an output torque of the combustion engine, a boost pressure of the fresh gas supplied to the combustion engine, injection quantities of fuel supplied to the combustion engine, ignition times with which the combustion of fuel is initiated in one or more combustion chambers of the combustion engine, a temperature of coolant of the combustion engine, a temperature of the exhaust aftertreatment system and/or components of a high-pressure and/or low-pressure exhaust gas recirculation can be taken into account. These operating parameters of the internal combustion engines can in turn be measured and/or modeled.

The environmental emission can be determined as an emission integral for the total distance driven (at one/each point in time). In particular, it can be taken into account thereby that a legally defined emission limit value can also refer to the total distance driven (at one/each point in time), wherein, in the case of a value related to a distance unit (e.g., "mass"/km or "number"/km), a comparison with the emission limit value can be made by dividing the emission integral by the corresponding number of distance units comprising the total distance driven. Alternatively or in addition, the environmental emission can be determined as an emission integral for a partial distance driven of a defined length (for example, 10 km, preferably 5 km), whereby a faster and/or more accurate determination of an imminent exceeding of one of the threshold values can be made. If the environmental emission is determined as an emission integral for a partial distance driven, this can preferably be carried out for a sequence of corresponding partial distances. Preferably, a partial distance is viewed backwards starting from the current total distance (the last 5 km or 10 km in each case).

If the environmental emission is determined as an emission integral with regard to the total distance driven and a partial distance driven, it may preferably be provided that exceeding one of the threshold values in the context of one of these determinations already leads to the associated measure(s) (power limitation or power-neutral operation adjustment and/or triggering of a warning message).

The combustion engine of a motor vehicle operated according to the invention can be a (compression-ignition and quality-controlled) diesel engine or a (spark-ignition and quantity-controlled) gasoline engine or a functional combination thereof, e.g., a combustion engine with homogeneous compression ignition. The combustion engine can be operated in this case with liquid fuel (i.e., diesel or gasoline) and also with a gaseous fuel (in particular natural gas, LNG, or LPG).

A motor vehicle that can be operated according to the invention can preferably be a land vehicle, particularly preferably a wheel-based and non-rail-bound motor vehicle (preferably a passenger car or a truck).

A subject of the invention is also a control device with a memory, wherein a computer program is stored in the memory, during the execution of which a method of the invention can be carried out.

The invention additionally relates to a computer program with a program code for carrying out the method of the invention when the computer program is executed on a computer.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
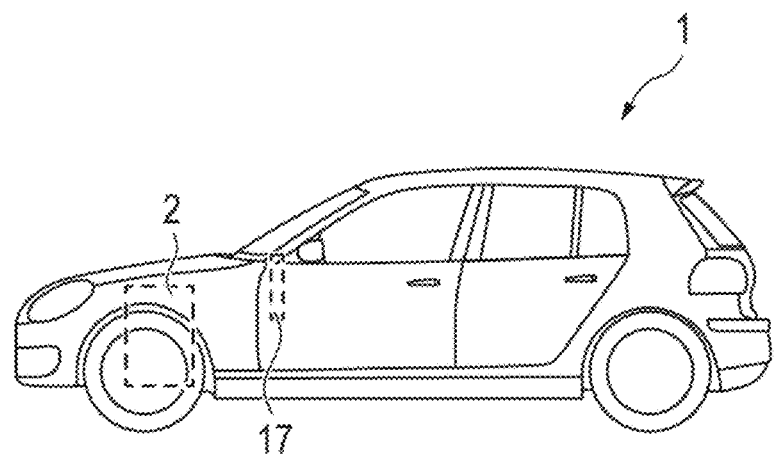
FIG. 1 shows a motor vehicle that can be operated according to the invention.

FIG. 1 shows a motor vehicle 1 designed for operation according to the invention. The motor vehicle comprises an internal combustion engine 2.

Figure 2:
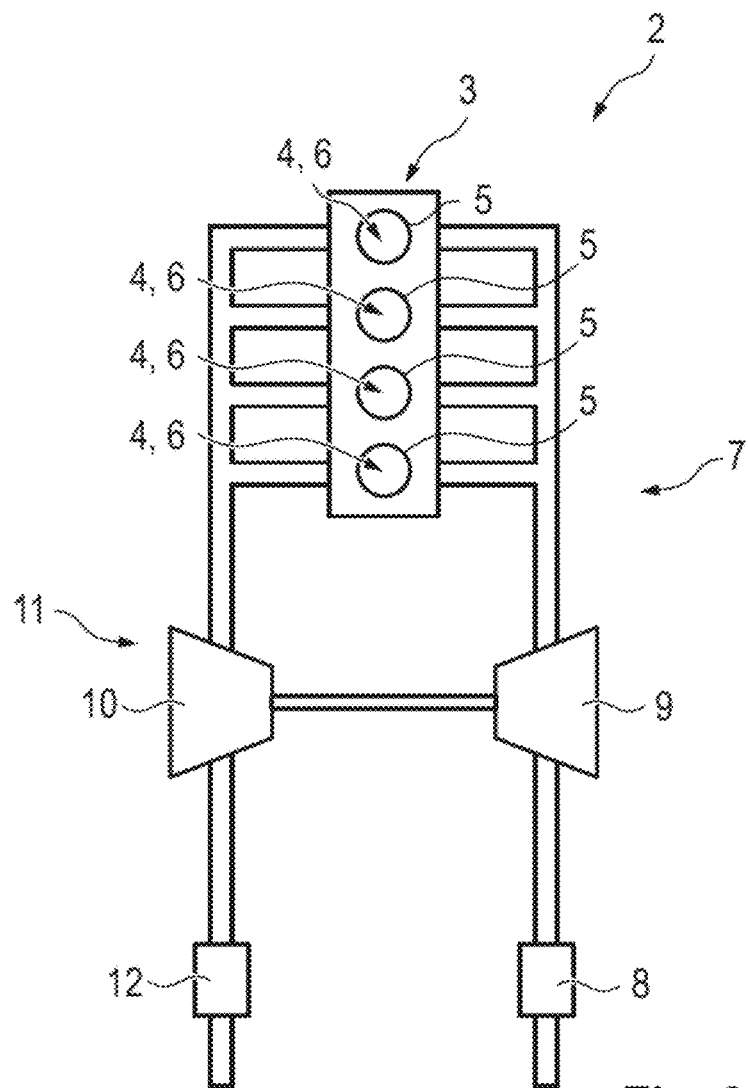
FIG. 2 shows an internal combustion engine of the motor vehicle.

Internal combustion engine 2 according to FIG. 2 comprises a combustion engine 3, which by way of example is designed in the form of a reciprocating engine with four cylinder ports 4 arranged in series. Cylinder ports 4 each delimit a combustion chamber 6 with reciprocating pistons 5, guided therein, and with a cylinder head. Fresh gas is supplied to combustion chambers 6 via a fresh gas line 7 during operation of combustion engine 3. The fresh gas is at least mainly air that is drawn in from the surroundings and then passed through an air filter 8 and then through a fresh gas compressor 9. This fresh gas compressor 9 is part of an exhaust gas turbocharger, which also comprises an exhaust gas turbine 10 integrated into an exhaust line 11 of internal combustion engine 1. Exhaust gas arising during the combustion of mixture quantities, consisting of the fresh gas as well as, for example, fuel injected directly into combustion chambers 6 via fuel injectors, is discharged via exhaust line 11 and here passed through at least one exhaust aftertreatment device 12.

The exhaust gas usually contains a number of exhaust components whose emission into the surroundings (environmental emission) is restricted by law. Such restrictions can be provided in particular for the following exhaust components: HC, CO, NOx, (soot) particles, $NH_3$, $N_2O$, and $CH_2O$. The legal restrictions for such exhaust components are usually defined as a limit value that specifies a quantity (in particular mass) of the exhaust component that may be emitted over a defined distance unit, in particular per kilometer, of a travel distance of motor vehicle 1, wherein it is checked whether the environmental emission of the particular exhaust component is complied with on average over the distance driven on a journey.

Figure 3:
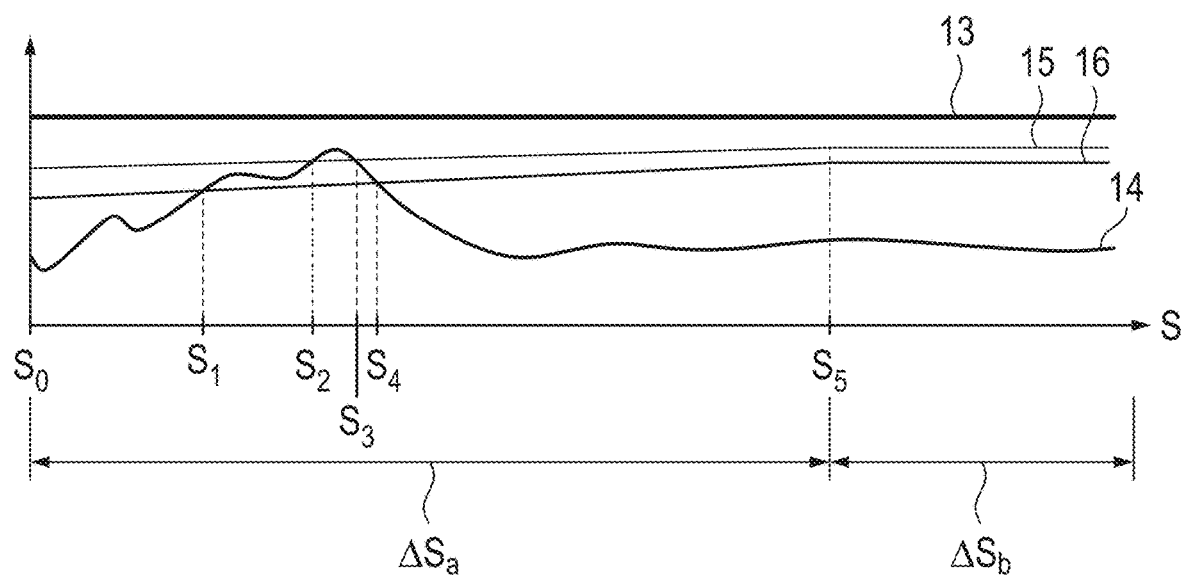
FIG. 3 shows a curve of an environmental emission of an exhaust component, which is part of the exhaust gas of the internal combustion engine, over a travel distance of the motor vehicle as well as curves of an emission limit value defined in this respect, a limitation threshold value, and a warning threshold value.

Such an emission limit value with regard to an exhaust component is drawn with the (straight) course line 13 in FIG. 3. Furthermore, an exemplary course of the environmental emissions of this exhaust component (course line 14) over the travel distance s, determined as the emission integral divided by the distance driven in each case, as well as the course lines with respect to a limitation threshold value (course line 15) and a warning threshold value (course line 16) are shown in FIG. 3. The limitation threshold value 15 is always lower than the emission limit value 13, and the warning threshold value 16 is always lower than the limitation threshold value 15. Whereas the emission limit value 13 remains constant over the travel distance s, a linear increase is provided for both the limitation threshold value 15 and the warning threshold value 16 during a first travel distance section $\alpha s_a$, which can extend, for example, from the start of driving $s_0$ up to a (fifth) travel distance $s_5$ of 50 km, wherein the warning threshold value 16 increases more greatly than the limitation threshold value 15. During a second travel distance section $\alpha s_b$, which immediately follows the first travel distance section $\alpha s_a$ and extends to the end of the driving, in contrast, the limitation threshold value 15 and the warning threshold 16 also remain constant. Preferably, it can be provided that the limitation threshold value 15 at the start of driving $s_0$ is at most 90%, preferably 80%, particularly preferably 60% of the emission limit value 13 and increases to at most 99%, preferably 97%, particularly preferably 95% of the emission limit value 13 by the end of the first travel distance section $\alpha s_a$. In contrast, the warning threshold value 16 can be at most 98%, preferably 95%, particularly preferably 90% of the limitation threshold value 15 at the start of driving $s_0$ and can increase to at most 95%, preferably 98%, particularly preferably 99% of the limitation threshold value 15 at the end of the first travel distance section $\alpha s_a$.

According to FIG. 3, curve 14 of the environmental emission of exhaust component 14 is always below the warning threshold value 16 at the start of driving $s_0$ until a first travel distance $s_1$ is reached, so that internal combustion engine 2 is operated in normal mode. When the warning threshold value 16 applicable at this point in time or for the travel distance $s_1$ is exceeded, operation of internal combustion engine 2 is adjusted in a power-neutral manner so that the environmental emission 14 of the exhaust component is reduced. This serves to avoid, as far as possible, a further increase of the distance-related environmental emission 14 of the exhaust component, in order to also avoid, as far as possible, the imminent exceeding of limitation threshold value 15, above which operation of combustion engine 3 is limited with regard to the deliverable power. Furthermore, when the warning threshold value 16 is exceeded, a warning message is triggered and displayed, for example, on a display 17 in an interior of motor vehicle 1, in order to inform a driver of motor vehicle 1 of an imminent power limitation.

According to the exemplary course of the environmental emission 14 of the exhaust component in FIG. 3, the warning threshold value 16 applicable at this time is nevertheless exceeded after a (second) travel distance $s_2$, which then implements the power limitation for the operation of combustion engine 3. It is to be reliably avoided thereby that emission limit value 13 is also exceeded. The power limitation can be provided as a measure that supplements the power-neutral operational adjustment or replaces it partially or completely.

According to FIG. 3, limitation threshold value 15 is also not reached again due to the power limitation after a (third) travel distance $s_3$, so that the power limitation can be reversed again. Because the environmental emission 14 of the exhaust component in relation to the travel distance s is then still above then applicable warning threshold value 16, the power-neutral operation adjustment is continued or restarted. According to FIG. 3, this only ends after a (fourth) travel distance $s_4$ with the falling below of the then applicable warning threshold 16. Internal combustion engine 1 is then again operated in normal mode.

The normal operation of internal combustion engine 1 in the travel section between the start of driving $s_0$ and the first travel distance $s_1$ can differ from the normal operation starting from the fourth travel distance $s_4$ because, for example, certain measures, which should lead to the fastest possible warm-up of internal combustion engine 1 and, in particular, the exhaust aftertreatment system 12 thereof, can be implemented at the start of driving, particularly if a cold start of internal combustion engine 1 was carried out for this. In the present context, normal operation is therefore understood to be the operation of the internal combustion engine in which neither a power limitation of the invention is implemented due to the limitation threshold value 15 being exceeded nor a torque-neutral operation adjustment due to the warning threshold value 16 being exceeded.

FIG. 3 shows a monitoring and possible measures with regard to the environmental emission 14 of a single exhaust component. It is preferably provided that such monitoring is carried out separately for each of the exhaust components mentioned, wherein the measure(s) described in this regard is/are implemented even if one of the warning threshold values or one of the limitation threshold values is exceeded.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a motor vehicle with an internal combustion engine comprising a combustion engine and an exhaust line with an exhaust aftertreatment system, the method comprising:
   determining at least one environmental emission of at least one exhaust component contained in exhaust gas generated by the combustion engine;
   limiting operation of the internal combustion engine with respect to a deliverable power when a limitation threshold value for the at least one environmental emission of the at least one exhaust component is exceeded; and
   if triggering a warning message and/or adapting the operation of the internal combustion engine in a power-neutral manner, such that the at least one environmental emission is reduced, when a warning threshold value for the at least one environmental emission of the at least one exhaust component is exceeded, wherein the warning threshold value is lower than the limitation threshold value.

2. The method according to claim 1, wherein the limitation threshold value is between 50% and 99% of an emission limit value defined for the at least one exhaust component.

3. The method according to claim 2, wherein the at least one environmental emission of the at least one exhaust component, the limitation threshold value, the warning threshold value and the emission limit value are related to a travel distance.

4. The method according to claim 1, wherein the warning threshold value is between 90% and 99% of the limitation threshold value.

5. The method according to claim 1, wherein the limitation threshold value and/or the warning threshold value increase/increases at least in sections with an increasing travel distance.

6. The method according to claim 1, wherein the limitation threshold value and/or the warning threshold value increase with an increasing travel distance during a first travel distance section and remain constant during a second travel distance section.

7. The method according to claim 6, wherein the warning threshold value increases more greatly than the limitation threshold value during the first travel distance section.

8. The method according to claim 1, wherein the at least one exhaust component includes at least one of the following: HC, CO, NOX, particles, NH3, N2O, and CH2O.

9. The method according to claim 1, wherein the at least one environmental emission of the at least one exhaust component is measured and/or modeled.

10. The method according to claim 1, wherein the at least one environmental emission is determined as an emission integral over a total distance driven and/or as an emission integral over a partial distance driven.

11. The method according to claim 1, wherein the limitation threshold value and the warning threshold value increase with an increasing travel distance during a first travel distance section and remain constant during a second travel distance section.

12. The method according to claim 11, wherein the limitation threshold value is between 50% and 99% of an emission limit value defined for the at least one exhaust component, and wherein the emission limit value remains constant through both the first travel distance section and the second travel distance section.

13. The method according to claim 11, wherein the warning threshold value increases more greatly than the limitation threshold value during the first travel distance section.

* * * * *